United States Patent [19]

Fujiki et al.

[11] Patent Number: 4,673,621

[45] Date of Patent: Jun. 16, 1987

[54] SURFACE-RELEASING AGENT AGAINST STICKING ADHESIVE

[75] Inventors: Hironao Fujiki; Koichi Yamaguchi; Yasushi Yamamoto, all of Gunma, Japan

[73] Assignee: Shin-Etsu Chemical Co., Ltd., Tokyo, Japan

[21] Appl. No.: 842,542

[22] Filed: Mar. 21, 1986

[30] Foreign Application Priority Data

Apr. 1, 1985 [JP] Japan ................................ 60-68760

[51] Int. Cl.$^4$ ............................................... B32B 7/04
[52] U.S. Cl. ................................... 428/420; 428/451; 524/544; 526/245
[58] Field of Search .................. 526/245; 524/544; 428/420, 451

[56] References Cited

U.S. PATENT DOCUMENTS

| | | | |
|---|---|---|---|
| 2,877,207 | 3/1959 | Cox et al. | 526/245 |
| 2,940,947 | 6/1960 | Welch et al. | 526/245 |
| 3,467,634 | 9/1969 | Jacknow et al. | 526/245 |
| 3,975,352 | 8/1976 | Yoerger et al. | 526/245 |
| 4,053,445 | 10/1977 | Schulze | 524/544 |
| 4,125,673 | 11/1978 | Roth et al. | 524/544 |
| 4,495,243 | 1/1985 | Kishi | 526/245 |

FOREIGN PATENT DOCUMENTS

58-42682  3/1983  Japan .................................. 524/544

*Primary Examiner*—Joseph L. Schofer
*Assistant Examiner*—N. Sarofim
*Attorney, Agent, or Firm*—Jules E. Goldberg

[57] ABSTRACT

The principal ingredient of the surface-releasing agent is a coplymeric resin obtained by the polymerization of a monomer mixture composed of 50 to 99.5% by weight of a polyfluoroalkyl vinyl monomer such as 2-(perfluorooctyl)ethyl (meth)acrylate and (2) from 50 to 0.5% by weight of an organosilicon-containing vinyl monomer having at least one hydrolyzable group in a molecule such as vinyl triethoxy silane and 3-methacryloxypropyl trimethoxy silane, optionally, combined with other vinyl monomers. The surface-releasing agent is very effective even against silicone-based sticking adhesives.

3 Claims, No Drawings

SURFACE-RELEASING AGENT AGAINST STICKING ADHESIVE

BACKGROUND OF THE INVENTION

The present invention relates to a surface-releasing agent against sticking adhesives or, more particularly, to a surface-releasing composition against sticking adhesives having excellent repellency against water and oils and good transparency and capable of exhibiting excellent surface-releasability even against silicone-based sticking adhesives.

When it is desired to impart surface-releasability against sticking adhesives, as is well known, films or tapes of fluorocarbon resins are conventionally employed with or without embossing but the effectiveness thereof as a means for surface-releasing is limited. Although various kinds of fluorine-containing copolymeric resins are useful as a special industrial material in the applications including water-repellent textile finishing agents and protecting agents for external walls of building by utilizing the water-repellency and oil-repellency inherent in fluorine-containing organic compounds and sheathing material on optical fibers and material of contact lenses by utilizing the optical properties thereof. When such a fluorocarbon resin is used in the form of a film or in the form of a coating composition with an object to serve as a means for providing surface-releasability, however, the film or coating layer formed of the coating composition readily falls off the surface of the substrate body such as glass, paper, plastic, metal and the like due to the poor adhesiveness thereof to the substrate surface so that the object of surface-releasing cannot be achieved.

Accordingly, proposals have been made to use, as a principal ingredient of a surface-releasing agent against sticking adhesives, a copolymeric resin of a fluorinated alkyl vinyl monomer with maleic anhydride or a vinylic monomer having a hydroxy group, carboxyl group and the like usually considered to be effective to impart adhesiveness to the substrate surface. Although the copolymeric resin with a vinylic monomer has no adverse influences on the sticking power of a sticking adhesive, the surface releasability as an inherent characteristic of flourinated alkyl-containing resins cannot be fully exhibited thereby. Further, the copolymeric resin with maleic anhydride is disadvantageous because of the appearance of turbidity in a transparent substrate film coated therewith in addition to the decrease in the surface releasability when it is prolongedly exposed to an atmosphere of high humidity although substantial increase can be obtained in the adhesiveness of the resin to the substrate surface.

When the sticking adhesive is of the silicone-based type having particularly high sticking power among others, conventional surface-releasing agents known in the prior art are far from satisfactory so that there is no choice in the selection of surface releasing agents but to use the above described ones even though they are unsatisfactory.

SUMMARY OF THE INVENTION

The surface-releasing agent of the invention has been developed with an object to solve the above described problems and disadvantages in the conventional surface-releasing agents and the inventive composition as a surface-releasing agent comprises:

(a) a solvent; and
(b) a copolymer dissolved in the solvent which is prepared by the polymerization of a monomer mixture composed of
  (1) from 50 to 99.5% by weight of an polyfluoroalkyl vinyl monomer,
  (2) from 0.5 to 50% by weight of an organosilyl-substituted vinyl monomer having at least one hydrolyzable group bonded to the silicon atom in a molecule, and
  (3) up to 49% by weight of a vinyl monomer other than the monomers (1) and (2) copolymerizable with the monomer (1).

DETAILED DESCRIPTION OF THE PREFERRED EMBODIMENTS

As is understood from the above given summarizing description, the most characteristic feature of the inventive surface-releasing agent consists in the use of a very specific copolymer (b) as the principal ingredient thereof. As a consequence of this unique feature, the surface-releasing agent easily forms a surface film which firmly adheres to the surface of substrate of various materials such as glass, paper, plastic, metal and the like capable of exhibiting very strong water-repellency and oil-repellency inherent in fluorine-containing organic compounds and excellent surface releasability even against silicone-based sticking adhesives.

The monomer (1) comprised in the monomer mixture from which the copolymeric resin is prepared by the polymerization is a vinylic monomer containing a polyfluoroalkyl group in a molecule. The polyfluoroalkyl group here implied is a substituted alkyl group obtained by replacing a plural number of the hydrogen atoms in an alkyl group such as methyl, ethyl, propyl, butyl and octyl groups with fluorine atoms. Particular examples of such a polyfluoroalkyl group include those compounds expressed by the following structural formulas, in which the symbols Me, i-Pr and Vi denote methyl, isopropyl and vinyl groups, respectively:

$ViCO-OCH_2CF_3$; $CH_2=CMeCO-OCH_2CF_3$; $ViCO-OCH_2CF_2CF_2H$; $CH_2=CMeCO-OCH(CF_3)_2$; $ViCO-OCHMeC_3F_7$; $ViCO-OCH_2C_4F_9$; $CH_2=CMeCO-OCH_2C_4F_9$; $ViCO-OCH_2CF_2CF_2CF_2F_2H$; $CH_2=CMeCO-OCH_2C_6F_{13}$; $CH_2=CMeCO-OCH_2CH_2C_8F_{17}$; and $ViCO-OCH_2CH_2C_8F_{17}$ as the examples of acrylic and methacrylic ester compounds and $ViOCH_2CH_2C_8H_{17}$; $ViCO-OCH_2CH_2OCH_2CF_3$; $ViCO-OCH_2CF(CF_3)-[-OCF_2CF(CF_3)]_nOC_3F_7$; $CH_2CMeCO-OCH_2CH_2OCF_2CF_2H$; and $ViCO-OCH_2CH_2OCH_2C_4F_9$ as the examples of the compounds having one or more of ether linkages. Compounds having a strongly polar group such as sulfonate ester group are less preferable with a compound of the formula $CH_2=CMeCO-OCH_2CH_2N(i-Pr)-SO_3C_8F_{17}$ as a typical one.

These polyfluoroalkyl vinyl monomers can be used either singly or as a combination of two kinds or more according to need. The polyfluoroalkyl group should preferably be a fluorinated butyl or higher group since the surface releasing power of the resultant copolymeric resin is increased with the increase in the fluorine content.

The amount of the polyfluoroalkyl vinyl monomer or monomers in the monomer mixture should be in the range from 50 to 99.5% by weight or, preferably, from 70 to 95% by weight. When the amount thereof is smaller than 50% by weight, no strong surface releasing effect can be obtained against silicone-based sticking adhesives. When the amount thereof exceeds 99.5% by weight, on the other hand, the surface-releasing agent may eventually migrate toward the layer of the sticking adhesive as a result of decreased adhesiveness of the surface-releasing agent to the substrate surface so that the stickiness of the sticking adhesive is lost although the releasing power may be sufficiently strong.

The monomer (2) comprised in the monomer mixture and copolymerized with the above described polyfluoroalkyl vinyl monomer is an organosilyl-substituted vinyl monomer having at least one hydrolyzable group bonded to the silicon atom in a molecule. Exemplary of the hydrolyzable group above mentioned are acyloxy groups, e.g. acetoxy, octanoyloxy and benzoyloxy groups, ketoxime groups, e.g. dimethyl ketoxime, methyl ethyl ketoxime and diethyl ketoxime groups, alkoxy groups, e.g. methoxy, ethoxy and propoxy groups, alkenyloxy groups, e.g. isopropenyloxy and 1-ethyl-2-methyl vinyloxy groups, substituted amino groups, e.g. dimethyl amino, diethyl amino, butyl amino and cyclohexyl amino groups, substituted aminoxy groups, e.g. dimethyl aminoxy and diethyl aminoxy groups, amido groups, e.g. N-methyl acetamido, N-ethyl acetamido and N-methyl benzamido groups, and others. The hydrolyzable group should be selected by excluding those having high electronic stability or large steric hindrance and those producing a hydrolysis product of high boiling point in view of the requirement that the hydrolyzable group is separated from the silicon atom by the hydrolysis to form a hydrolysis product which should be rapidly dissipated outwardly.

Particular examples of the compound suitable as the monomer (2) include the organosilicon compounds having a vinyl, acryloxy or methacryloxy group and at least one hydrolyzable group in a molecule expressed by the following structural formulas, in which the symbols Me, Et, Vi and Ph denote methyl, ethyl, vinyl and phenyl groups, respectively:

Vi—CO—O—CH$_2$CH$_2$CH$_2$Si(OMe)$_3$; Vi—CO—O—CH$_2$CH$_2$CH$_2$Si(OEt)$_3$;
CH$_2$=CMe—CO—O—CH$_2$CH$_2$CH$_2$Si(OMe)$_3$;
CH$_2$=CMe—CO—O—CH$_2$CH$_2$CH$_2$Si(OEt)$_3$; Vi—CO—O—CH$_2$CH$_2$CH$_2$SiMe(OEt)$_2$;
CH$_2$=CMe—CO—O—CH$_2$CH$_2$CH$_2$SiEt(OMe)$_2$;
CH$_2$=CMe—CO—O—CH$_2$CH$_2$CH$_2$SiMe$_2$(OEt);
CH$_2$=CMe—CO—O—CH$_2$CH$_2$CH$_2$SiMe$_2$OH; Vi—CO—O—CH$_2$CH$_2$CH$_2$Si(O—CO—Me)$_3$;
CH$_2$=CMe—CO—O—CH$_2$CH$_2$CH$_2$SiEt(O—CO—Me)$_2$; CH$_2$=CMe—CO—O—CH$_2$CH$_2$CH$_2$SiMe(NMe—COMe)$_2$; VI—CO—O—CH$_2$CH$_2$CH$_2$SiMe(O—NMeEt)$_2$;
CH$_2$=CMe—CO—O—CH$_2$CH$_2$CH$_2$SiPh(O—NMeEt)$_2$; ViSi(O—N=CMeEt)$_3$; ViSi(OMe)$_3$; ViSi(OEt)$_3$; ViSiMe(OMe)$_2$; ViSi(O—CO—Me)$_3$; ViSiMe$_2$(OEt); ViMe$_2$Si—O—SiMe(OMe)$_2$; ViSiEt(O—CO—Me)$_2$; and ViMeSi(O—NMeEt)$_2$.

These organosilyl-substituted monomers can be used either singly or as a combination of two kinds or more according to need. Partial hydrolysis-condensation products of these monomers can also be used.

The amount of the monomer (2) in the monomer mixture should be in the range from 0.5 to 50% by weight or, preferably, from 5 to 30% by weight, the remainder being the monomer (1). When the amount thereof is smaller than 0.5% by weight, the coating film of the surface-releasing agent cannot exhibit full performance. When the amount thereof is too large, on the other hand, the coating film of the surface-releasing agent may lose tenacity due to the excessively high crosslinking density in addition to the disadvantage of possible gelation of the polymerization mixture in the course of polymerization.

The monomer (3) in the monomer mixture is not an essential monomeric component but is added to the monomer mixture with an object to obtain a coating film of the copolymeric resin having adequately controlled strength, hardness, adhesiveness to the substrate surface and insusceptibility to stain. Exemplary of the vinylic monomer as the third monomeric component in the monomer mixture are: acrylates and methacrylates, e.g. methyl acrylate, methyl methacrylate, ethyl acrylate, ethyl methacrylate, n-butyl acrylate, n-butyl methacrylate, isobutyl acrylate, isobutyl methacrylate, 2-ehtylhexyl acrylate and 2-ethylhexyl methacrylate; acrylates and methacrylates containing an organosilicon group, e.g. 3-tris(trimethylsiloxy)silyl propyl acrylate and methacrylate and 3-bis(trimethylsiloxy)methylsilyl propyl acrylate and methacrylate; aromatic vinyl compounds, e.g. styrene and vinyl toluenes; diesters of an unsaturated dicarboxylic acid such as maleic and fumaric acids with a monohydric alcohol having 1 to 18 carbon atoms; maleic anhydride; vinyl ethers, e.g. n-butyl vinyl ether and cyclohexyl vinyl ether; 2-hydroxyethyl acrylate and methacrylate; and so on. The amount of the above named third monomer, when used, in the monomer mixture should not exceed 49% by weight.

The copolymeric resin as the principal ingredient of the inventive surface-releasing agent can be prepared by polymerizing a monomer mixture composed of the above described monomers (1), (2) and, optionally, (3) in a specified proportion according to a known procedure such as solution polymerization by use of a free radical polymerization initiator. The polymerization initiator suitable in this case includes azobisisobutyronitrile, di-tert-butyl peroxide, dibenzoyl peroxide, tert-butyl perbenzoate, methyl ethyl ketone peroxide and the like. In view of the relatively large content of the fluorinated acrylate or methacrylate in the monomer mixture, the solution polymerization should be performed, preferably, in an organic solvent selected from the class consisting of fluorinated hydrocarbon solvents such as flon-113 and Daiflon S2-T (a product by Daikin Co.), acetate esters such as ethyl acetate and butyl acetate, ketones such as methyl ethyl ketone and methyl isobutyl ketone, and the like. In some cases, the solution polymerization is performed in a solvent mixture composed of the above named specific solvent and a monohydric lower alcohol such as methyl, ethyl, propyl and butyl alcohols. If necessary, the polymerization mixture may contain a chain transfer agent such as a mercaptan compound.

The polymerization mixture after completion of the polymerization reaction as such or diluted to a suitable concentration may be used as the inventive surface-releasing agent. It is preferable that a substantial portion of the solvent in the inventive composition is a fluorine-containing organic solvent which may be the solvent used in the above mentioned polymerization procedure. Other suitable fluorine-containing organic solvents include 1,3-di(trifluoromethyl)benzene, 2-perfluoropropyl pentahydropyran, 2-perfluorobutyl tetrahydrofuran, tri(perfluorobutyl)amine and the like. If necessary, the solution can be admixed with a curing catalyst such as titanate esters, e.g. tetrabutyl titanate, and organotin compounds, e.g. dibutyltin dilaurate and dioctyltin diacetate.

When the inventive surface-releasing agent is applied to the surface of a substrate such as glass, paper, plastic, metal and the like and dried, a tenacious cured coating film of the copolymeric resin is formed to firmly adhere to the substrate surface. The cured coating film exhibits excellent water- and oil-repellency without stickiness owing to the large fluorine content in the copolymeric resin so that good surface-releasing effect can be obtained even against silicone-based sticking adhesives. Although the surface-releasing agent prepared in the above described manner gives a clear coating film, it is optional that the composition is admixed with a pigment so as to give a cured coating film of a desired color.

In the following, examples are given to illustrate the inventive surface-releasing agent in more detail, in which the expression of "parts" always refers to "parts by weight".

EXAMPLES 1 TO 8 AND COMPARATIVE EXAMPLES 1 TO 11

Into a four-necked flask equipped with a stirrer, a gas inlet tube, a reflux condenser and a thermometer were introduced, in Example 1, 235 parts of Daiflon S2-T (supra), 90 parts of 2-(perfluorooctyl)ethyl methacrylate, 10 parts of vinyl triethoxy silane and 0.5 part of azobisisobutyronitrile to form a polymerization mixture which was heated for 5 hours at a temperature of 60° to 70° C. to effect the polymerization reaction while nitrogen gas was bubbled thereinto. After aging for 15 hours at the same temperature, the polymerization mixture was cooled to room temperature and diluted by adding flon-113 so as to have a solid content of 30% by weight.

The thus prepared master solution was further diluted with flon-113 to have a solid content of 5% by weight and the diluted solution was applied to a polyethylene-laminated paper as a substrate followed by a heat treatment at 140° C. for 30 seconds to cure the copolymeric resin.

A pressure-sensitive silicone-based adhesive tape (Nitoflon #903, a product by Nitto Denko Co.) was press-bonded to the thus treated polyethylene-laminated paper under a pressure of 20 g/cm$^2$ and kept standing as such at 70° C. for 24 hours or at 25° C. for 5 days. Thereafter, the adhesive tape was peeled off the polyethylene-laminated paper to determine the force in g/19 mm necessary for peeling. Further, the thus separated adhesive tape was again press-bonded to a polished stainless steel plate to determine the adhesive bonding strength in the same unit. The results are shown in Table 1.

The experimental procedure in each of the other Examples and Comparative Examples was substantially the same as above excepting the formulation of the monomer mixture subjected to the copolymerization as is shown in Table 1. In the table, the polyfluoroalkyl vinyl monomer as the monomer (1), the organosilicon-containing vinyl monomer as the monomer (2) and the optional vinyl monomer as the monomer (3) are given by the symbols A to F, I and II, and I to IV, respectively, each of which denotes a compound shown below.

Monomer (1)
A: 2-(Perfluorooctyl)ethyl methacrylate
B: 2-(Perfluorooctyl)ethyl acrylate
C: $CH_2=CMe-CO-O-CH_2CH_2CH_2-N(C_3H_7)-SO_2C_8F_{17}$
D: $Vi-CO-O-CH_2CH_2CH_2-N(C_3H_7)-SO_2C_8F_{17}$
E: 2,2,2-Trifluoroethyl methacrylate
F: 2,2,2-Trifluoroethyl acrylate
Monomer (2)
I: Vinyl triethoxy silane
II: 3-Methacryloxypropyl trimethoxy silane
Monomer (3)
I: Methacrylic acid
II: Maleic anhydride
III: Styrene
IV: 2-Hydroxyethyl methacrylate
V: Methyl methacrylate

TABLE 1

|  | Monomer (1) (parts) | Monomer (2) (parts) | Monomer (3) (parts) | After 24 hours at 70° C. | | After 5 days at 25° C. | |
|---|---|---|---|---|---|---|---|
|  |  |  |  | Peeling force | Adhesive strength | Peeling force | Adhesive strength |
| Example |  |  |  |  |  |  |  |
| 1 | A (90) | I (10) | — | 40 | 450 | 55 | 455 |
| 2 | A (90) | II (10) | — | 65 | 415 | 70 | 460 |
| 3 | B (90) | I (10) | — | 60 | 425 | 68 | 450 |
| 4 | A (95) | I (5) | — | 40 | 80 | 60 | 120 |
| 5 | A (80) | I (10) | III (10) | 50 | 410 | 60 | 455 |
| 6 | A (90) | I (5) | II (5) | 65 | 400 | 80 | 470 |
| 7 | A (80) | I (20) | — | 45 | 400 | 55 | 450 |
| 8 | A (80) | I (5) | V (15) | 120 | 450 | 160 | 450 |
| 9 | A (99) | I (1) | — | 40 | 465 | 55 | 465 |
| Comparative Example |  |  |  |  |  |  |  |
| 1 | A (50) E (45) | I (5) | — | 150 | 460 | — | — |
| 2 | E (50) F (45) | I (5) | — | 200 | 470 | — | — |
| 3 | C (90) | I (10) | — | 470 | 300 | 325 | 435 |
| 4 | D (90) | I (10) | — | 250 | 10 | 300 | 250 |
| 5 | A (60) | — | I (40) | 450 | 440 | 350 | 340 |
| 6 | A (50) | — | I (25) | 410 | 480 | 390 | 375 |
| 7 | A (80) | — | I (20) | 450 | 425 | 360 | 370 |
| 8 | A (80) | — | II (20) | 450 | 425 | — | — |
| 9 | A (100) | — | — | 7 | 1 | 17 | 10 |
| 10 | A (90) | — | IV (10) | 8 | 5 | 10 | 5 |

TABLE 1-continued

| | Monomer (1) (parts) | Monomer (2) (parts) | Monomer (3) (parts) | After 24 hours at 70° C. | | After 5 days at 25° C. | |
|---|---|---|---|---|---|---|---|
| | | | | Peeling force | Adhesive strength | Peeling force | Adhesive strength |
| 11 | A (90) | — | III (10) | 5 | 4 | 5 | 0 |

EXAMPLES 9 TO 12 AND COMPARATIVE EXAMPLES 12 TO 14

In Examples 9 and 10, a polyethylene-laminated paper was coated with the surface-releasing agents prepared in Examples 6 and 7, respectively, and heated at 140° C. for 30 seconds to cure the composition followed by press-bonding of the same pressure-sensitive adhesive tape as used in the preceding Examples under the same conditions and standing at 70° C. for 24 hours or 5 days and at 25° C. for 24 hours or 5 days to determine the peeling force of the adhesive tape and the adhesive bonding strength of the thus separated adhesive tape to a stainless steel plate in the same manner as in the preceding Examples to give the results shown in Table 2.

The experimental procedures in Examples 11 and 12 were the same as in Examples 9 and 10, respectively, except that with polyethylene-laminated paper was replaced with a film of polyethylene terephthalate.

Further, the experimental procedures in Comparative Examples 12 and 13 were the same as in Examples 9 and 11, respectively, except that the surface-releasing agent was a commercially available silicone varnish (KS 778, a product by ShinEtsu Chemical Co.).

As a blank test, a similar test as above was undertaken in Comparative Example 14 by use of an untreated Teflon plate in place of the polyethylene-laminated paper or polyethylene terephthalate film coated with the surface-releasing agents. The results are also shown in Table 2.

TABLE 2

| | After 24 hours at 70° C. | | After 5 days at 70° C. | | After 24 hours at 25° C | | After 5 days at 25° C. | |
|---|---|---|---|---|---|---|---|---|
| | Peeling force | Adhesive strength | Peeling force | Adhesive strength | Peeling force | Adhesive strength | Peeling force | Adhesive strength |
| Example | | | | | | | | |
| 9 | 90 | 300 | 65 | 315 | 85 | 360 | 115 | 320 |
| 10 | 65 | 315 | 68 | 335 | 85 | 380 | 75 | 330 |
| 11 | 50 | 380 | 95 | 470 | 75 | 460 | 73 | 415 |
| 12 | 45 | 385 | 90 | 475 | 75 | 505 | 68 | 410 |
| Comparative Example | | | | | | | | |
| 12 | 145 | 295 | 265 | 345 | 135 | 320 | 73 | 285 |
| 13 | 640 | 295 | 650 | 210 | 490 | 345 | 133 | 415 |
| 14 | 738 | 300 | 290 | 345 | 240 | 450 | 625 | 310 |

EXAMPLES 13 TO 16 AND COMPARATIVE EXAMPLES 15 TO 17

The experimental procedures in Examples 13 to 16 were the same as in Examples 9 to 12, respectively, and the procedures in Comparative Examples 15 to 17 were the same as in Comparative Examples 12 to 14, respectively, excepting the replacement of the pressure-sensitive adhesive tape (Nitoflon #903) in the preceding examples with another pressure-sensitive silicone-based adhesive tape (Sony Chemical Tape). The results of the test carried out in the same manner as in the preceding Examples are shown in Table 3 below in g/50 mm for the peeling force of the adhesive tape from the substrate and adhesive bonding strength of the separated adhesive tape to a stainless steel plate either as press-bonded or after standing for 5 days at 70° C. and for 5 days at 25° C.

TABLE 3

| | | After 5 days at 70° C. | | After 5 days at 25° C. | |
|---|---|---|---|---|---|
| | | Peeling force | Adhesive strength | Peeling force | Adhesive strength |
| Example | 13 | 100 | 1675 | 170 | 1400 |
| | 14 | 60 | 1650 | 120 | 1325 |
| | 15 | 130 | 1650 | 170 | 1300–1600 |
| | 16 | 120 | 1700 | 150 | 1300–1600 |
| Comparative Example | 15 | 2500 | 1200 | 880 | 950 |
| | 16 | * | * | 700 | 1200 |
| | 17 | 320 | 500–900 | 1000 | 1000 |

*The surface-releasing film was transferred to the adhesive tape.

What is claimed is:

1. In a method for imparting surface-releasability to a substrate surface wherein a surface-releasing agent is applied to the substrate surface, the improvement which comprises the surface releasing agent comprising
   (a) a solvent; and
   (b) a copolymer dissolved in the solvent which is prepared by the polymerization of a monomer mixture consisting essentially of
      (1) from 50 to 99.5% by weight of a polyfluoroalkyl vinyl monomer, and
      (2) from 0.5 to 50% by weight of an organosilyl-substituted vinyl monomer having at least one hydrolyzable group bonded to the silicon atom in a molecule.

2. The method of claim 1 wherein the polyfluoroalkyl vinyl monomer is selected from the class consisting of fluoroalkyl acrylates and fluoroalkyl methacrylates.

3. The method of claim 1 wherein the solvent comprises a substantial proportion of a fluorine-containing organic solvent.

* * * * *